United States Patent Office 3,272,843
Patented Sept. 13, 1966

3,272,843
PHENYLENE-BIS-(3-BUTANE-1,2-DICARBOXYLIC ANHYDRIDES)
Sydney M. Spatz, Buffalo, and Russell I. Steiner, Williamsville, N.Y., assignors to Allied Chemical Corporation, New York, N.Y., a corporation of New York
No Drawing. Filed Feb. 1, 1961, Ser. No. 86,308
4 Claims. (Cl. 260—347.3)

This invention relates to the curing of epoxy resin compositions. More particularly it relates to thermosetting epoxide resin systems and to processes for making them. It is especially directed to novel thermosetting epoxy resin/dianhydride systems which are characterized by high heat distortion temperature characteristics.

Epoxy resins comprise a class of resins usually formed as the result of the reaction of an epihalohydrin and a phenol or aliphatic polyol. These resins are characterized by the inclusion within their structure of "epoxide" groups which permit the resin units to be homopolymerized with the aid of catalysts or copolymerized with the aid of hardening agents such as polyamines, polyamides, and organic acid anhydrides.

The epoxy resins by virtue of their excellent combination of physical, chemical and electrical properties have become an important class of plastic materials. They are used in an increasingly large volume in such varied fields as coatings, molding and encapsulation compounds, binders for laminates, adhesives and electrical insulation. In many such instances, the resulting resins are subjected to elevated temperatures. Unfortunately, the excellent properties of these resins at room temperature or slightly above, progressively deteriorate at or near the softening point of the resin.

Although in many instances epoxy resin compositions can be cured at room temperature, in order to produce a material possessing optimum properties and especially increased softening point, external heat and curing agents are required.

The prior art teaches the use of a variety of curing agents, each of which gives rise to a finished resin of widely different properties. Of the two main classes of curing agents, amines and acid anhydrides, the latter are characterized by curing epoxide resins with the evolution of a relatively small amount of heat, and give tough cured resins having relatively good heat stability.

More recently, dianhydrides have been suggested as curing agents on the theory that the extra functionality of these agents would, by increasing the density of cross linking within the polymer, give rise to cured polymers which were tougher and possessed even better heat stability. Unfortunately, the available tetracarboxylic dianhydrides are few in number and those which are available, are relatively costly, high melting, i.e. they are solid even at the usual formulating temperature, and possess poor compatibility in the resin system. The defect of high melting point can be overcome by the admixture with the dianhydride of a monoanhydride, such as phthalic acid anhydride to produce a mixture of satisfactory melting point. The mixture however, though lower melting and more compatible, dilutes and hence reduces the improvements gained by the dianhydride.

It is therefore an object of this invention to provide an epoxy resin/anhydride cured system which is distinguished by a high heat distortion temperature.

An ancillary object is to provide a dianhydride epoxy curing agent which is liquid at normal working temperature and compatible with the uncured epoxy resin.

Another object is to devise processes for the formulation of epoxy resin/dianhydride systems which possess satisfactory pot life and when cured are distinguished by a high heat distortion temperature.

In accordance with the present invention, it has been found that dianhydrides obtained by reacting a polyalkylbenzene, in which each alkyl group contains 2 to 6 carbon atoms, with maleic acid anhydride, make excellent curing agents for epoxy resins. In particular, the addition to an epoxy resin mass of an effective amount of phenylene-bis-(3-butane-1,2-dicarboxylic acid anhydride) of structural formula shown in column 4, results in a resin mass having a surprisingly high heat-distortion temperature. In addition, the cured resins possess, in general, excellent adhesion to metal surfaces, low shrinkage during cure, good electrical and mechanical properties and excellent stability under varying conditions of humidity and temperature.

Among the reactions theoretically possible when a dianhydride such as phenylene-bis-(3 - butane - 1,2 - dicarboxylic acid anhydride) is used as a curing agent of epoxy resins in accordance with this invention are the following:

(1) The reaction between the anhydride group and the secondary hydroxyl group in the polymer chain to form an ester linkage and a free carboxyl:

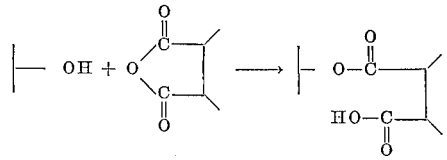

(2) The reaction between the resulting carboxyl groups and an epoxide group of the resin to give another ester linkage and a free hydroxyl:

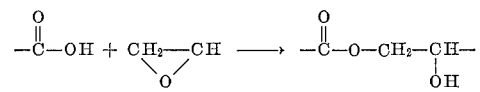

(3) The self-condensation, which probably is catalyzed by the carboxyl groups formed in reaction (1), between hydroxyl and epoxide groups of the polymer:

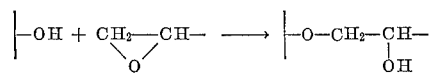

Since theoretically one anhydride moiety is sufficient to react completely with one oxirane group and with the resultant secondary hydroxyl group formed initially, it is convenient to express the ratio of dianhydride curing agent and epoxy resin in terms of molecular proportions between the reactive groups, i.e. as ratio of anhydride equivalents:[1] epoxy equivalents,[2] written hereinafter as $A/E$. In actual practice, however, the curing step involves quite complicated and heterogeneous reactions, and accordingly it has been found possible to obtain adequate cures when less than the theoretical unitary $A/E$ ratio is used. On the other hand, resins with superior properties are obtained when the $A/E$ ratio exceeds one. Accordingly,

---

[1] Anhydride equivalent is defined as the weight of anhydride which contains 1 gram chemical equivalent of anhydride groups —$(CO)_2O$.
[2] The epoxy equivalent is defined as the weight of epoxy resin in grams which contains 1 gram chemical equivalent of epoxy (oxirane) group. It is determined by reacting a known quantity of epoxy resin with a known quantity of hydrochloric acid and back titrating the excess acid to determine the amount consumed. Since one mol of acid reacts with each epoxy group according to

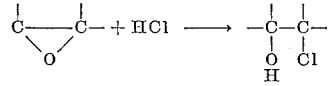

each mol of acid consumed is equivalent to one epoxy group.

we have found it feasible to use as an effective amount at least 0.6 anhydride equivalent per epoxide equivalents to obtain adequate curing. We prefer to use between 0.85 and 1.5 anhydride equivalents per epoxy equivalent, and especially between 1.00 and 1.25 anhydride equivalents per epoxy equivalent should be used. The use of still larger amounts of anhydride is operative but may be wasteful.

Further, the postcure temperature and time of the reaction can be varied over a considerable range. Because of its relatively moderate reactivity and extraordinary compatibility, phenylene - bis-(3-butane-1,2-dicarboxylic acid anhydride) is particularly easily incorporated into heated epoxy liquids. The postcuring of the resin, during which the major amount of the cross linking operation is effected, as indicated by the achievement of the maximum heat distortion temperature of the cured resins, is conveniently carried out at from about 150° to 250° C. for from 10–24 hours. A temperature of at least about 170° C. is preferred; and generally, a temperature of about 200° C. maintained for about 20–24 hours will result in a cured resin having a maximum heat distortion temperature.

The novel dianhydride curing agents of this invention can be prepared by condensing a polyalkyl benzene, preferably a technical mixture of the several isomeric forms of the polyalkyl benzene, with two molecular equivalents of maleic acid anhydride in the presence of a free radical catalyst, such as benzoyl peroxide, α,α'-azo-diisobutyronitrile and the like.

Typical peroxy catalysts other than benzoyl peroxide which can be used for this purpose include organic peroxides such as acetyl peroxide, lauryl peroxide, stearyl peroxide, acetone peroxide, tert.-butyl hydroperoxide, ditert.-butylperoxide, di-tert.-butyl diperphthalate, tert.-butyl perbenzoate, cumene hydroperoxide, hydroxy cyclohexyl hydroperoxide and the like; inorganic peroxide such as hydrogen peroxide; peroxy acids such as peracetic acid; etc. We have found that other free radical catalysts can be used instead of peroxy catalysts for producing our dianhydrides, e.g. α,α' - azodiisobutyronitrile as above stated; other azo compounds such as phenylazotriphenyl-methane or azodibenzoyl; triazenes (i.e. diazoamino compounds) such as 1-phenyl-3,3-dimethyltriazene; nitroso-acylarylamines such as N-nitrosoacetanilide; and nitroso-acylalkylamines such as N-benzyl-N-nitrosoacetamide. Still other nitrogen-containing compounds can be used under relatively severe heating conditions, e.g. oximes such as acetone oxime, butyraldoxime, cyclohexanone oxime, etc.; and other types such as organo-metallic compounds, e.g. tetraethyl lead, are also usable.

Although the amount of catalyst used can vary considerably, the preferred amount ranges from 2 to 10% of the maleic acid anhydride used, especially from 5 to 7%.

We have found that a very high ratio of dianhydrides to monoanhydrides is obtained by adding a solution of catalyst in slightly more than 1 mol portion of polyalkylbenzene, in small increments and over an extended period, to a mixture of at least 2 mol portions of maleic anhydride and about 1 mol portion of polyalkylbenzene. Mixtures containing more than 95% dianhydride and 5% monoanhydride have been obtained in this manner. Surprisingly, however, the most satisfactory products for our purpose are obtained by use of a relatively large mol ratio, such as about 10:1 of polyalkylbenzene:maleic anhydride in the initial reaction mixture, to which is added maleic anhydride and a solution of catalyst in polyalkylbenzene, the ultimate maleic anhydride:polyalkylbenzene mol ratio being about 0.5:1–1:1.

Temperatures to be employed in producing our dianhydrides are dependent on other conditions, especially catalyst proportion and stability, and are generally at least sufficient to assure presence of maleic anhydride rather than maleic acid, i.e. at least about 135° C. Suitably the temperature can be as high as allowed by the boiling point of the reaction mixture at the prevailing pressure, which usually will be atmospheric or higher. Thus with readily decomposable catalysts suitable temperatures lie from about 135° C. to the atmospheric boiling point of the reaction mixture; and with more stable catalysts higher temperatures can be used, such as 200°–300° C., under pressures at least sufficient to maintain a liquid phase.

The synthesis can be represented by the following equation:

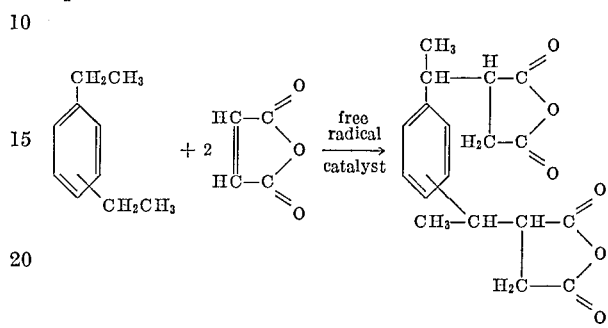

Other polyalkylbenzenes which can be employed in producing the subject dianhydrides, besides the diethyl-benzenes, are the primary and secondary dipropylbenzenes, the primary and secondary dibutylbenzenes, the primary and secondary dihexylbenzenes; and $C_1$–$C_6$ alkyl, nuclearly substituted, homologues of the foregoing. The primary dialkylbenzenes are preferred as being more reactive than the secondary isomers. The resulting dianhydrides in accordance with this invention have the structural formula:

in which $$\underset{R'}{\overset{R}{\diagdown}}C\diagup\hspace{-0.5em}\diagdown \quad \text{and} \quad \underset{R'''}{\overset{R''}{\diagdown}}C\diagup\hspace{-0.5em}\diagdown$$

are alkylidene radicals each containing 2 to 6 carbon atoms and $R^{iv}$ represents 4 nuclear substituents each selected from the group consisting of hydrogen and $C_1$–$C_6$ alkyl radicals. In the dianhydrides obtained from the preferred polyalkylbenzenes, viz. from primary dialkylbenzenes, all the substituents represented in the above formula by R', R'', and $R^{iv}$ are hydrogen atoms.

As an illustrative embodiment of the preparation of a dianhydride curing agent of this invention, the following example is given in which the parts are by weight and the temperatures are given in degrees centigrade.

EXAMPLE A

A mixture of 196 parts of maleic anhydride and 110 parts of diethylbenzene was heated to 135–145° C. A solution of 11 parts of benzoyl peroxide in 154 parts of diethylbenzene was added dropwise during 1½ hours while agitating the reaction mixture at 135–145° C. The agitated reaction mass was further heated for 1 hour at 135–145° C., then cooled and distilled in vacuo. The following fractions were collected:

To:
- 145–150° C./1 mm.—116.7 parts=unreacted diethylbenzene and maleic anhydride
- 145–200° C./1 mm.—10 parts=monoanhydride (2% yield)
- Residue—303.7 parts=dianhydride product—92% yield based on maleic anhydride (assuming that product is all the desired anhydride)

The neutral equivalent of the dianhydride product thus obtained was 162 (theory=165), indicating a product of good purity. The NE value of 162, which is slightly less than 165 for theory, suggests that the dianhydride product contains (a) no monoanhydride and (b) a small amount of polyanhydride of unknown constitution formed as a by-product in the reaction.

A particularly excellent product, based on its curing activity with epoxy resin, was obtained as follows:

EXAMPLE B

Diethylbenzene (460 parts, 3.4 mols) and maleic anhydride (30 parts, 0.3 mol) were heated in a nitrogen atmosphere to 165°–170° C. The mixture was agitated as maleic anhydride (558 parts, 5.7 mols) and a solution of benzoyl peroxide (33 parts, 0.135 mol) in diethylbenzene (472 parts, 3.5 mols) were added dropwise in separate streams to the agitated mass. The maleic anhydride was added in 60–75 minutes and the catalyst solution in 95–110 minutes. Thereafter the mixture was agitated at 165°–170° C. for ½–1 hour.

The mass was distilled in vacuo. The following fractions were collected:

To:
- 145–155° C./1–2 mm.—unchanged maleic anhydride and diethylbenzene
- 145–170° C./0.2–1 mm.—monoanhydride—505 parts.

The residue amounted to 632 parts and was identified as the dianhydride, phenylene-bis-(3-butane-1,2-dicarboxylic acid anhydride). The yield was about 60–65% of theory.

We have obtained our dianhydride from monoanhydride by reacting, in the presence of a free radical catalyst, maleic acid anhydride with a monoanhydride wherein one of the two succinic acid anhydride radicals in a dianhydride of this invention is replaced by a hydrogen atom; i.e. with a monoanhydride having the structural formula:

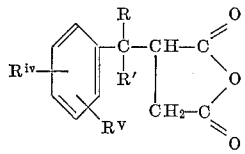

wherein

is an alkylidene radical contaning 2 to 6 carbon atoms, $R^{iv}$ represents 4 nuclear substituents each selected from the group consisting of hydrogen and $C_1$–$C_6$ alkyl radicals, and $R^v$ represents an alkyl radical containing 2 to 6 carbon atoms. The following example illustrates a method of doing this.

EXAMPLE C (1) *Preparation of monoanhydride in presence of α,α'-azo-diisobutyronitrile*

A mixture consisting of 39.2 parts (0.4 mol) of maleic anhydride and 495 parts (3.7 mols) of diethylbenzene was heated to 140° to 150°. Thereafter 5.8 parts (0.0354 mol) of α,α'-azodiisobutyronitrile dissolved in 188 parts (1.4 mol) of diethylbenzene were added dropwise over a 2 hour period, during which and at half hour intervals, 3 portions of 19.6 parts (0.2 mol) each of maleic anhydride were added. The reaction mass was heated at 138° to 166° in 1½ hours after the reactants had been charged.

The reaction mixture was then stripped of unreacted diethylbenzene under a vacuum of about 5 mm., which was reduced, as the forward flow decreased, to about 0.5 mm. The temperature was then gradually increased. A fraction distilling for the most part at 153° to 156°/0.4 to 0.5 mm. and amounting to 155 parts was collected. This fraction had an index of refraction $N_D^{25}$=1.5243. A second fraction, amounting to 7.0 parts distilled at 155° to 157°/0.5 mm. ($N_D^{25}$=1.5260).

Neutral equivalent of the first fraction (in methanol) found: 229.8, 231.6 (calculated for monoanhydride 232). A residue of 53 parts remained in the distillation flask.

(2) *Reaction of monoanhydride with maleic anhydride*

A mixture of 215 parts (0.925 mol) of the monoanhydride product prepared as described in (1) above and 9.8 parts (0.1 mol) of maleic anhydride was heated to between 140° and 150° and 1.46 parts (0.0089 mol) of α,α'-azodiisobutyronitrile suspended in 75 parts (0.323 mol) of the monoanhydride were added dropwise in about 2 hours. After about 20 minutes and at 20 minute intervals thereafter 3 portions of 4.9 parts (0.05 mol) each of maleic anhydride were charged to the mixture. The mass was heated for ¾ hour after the addition of catalyst slurry was complete.

The mass was distilled in vacuum whereby 207 parts of monoanhydride were recovered (boiling point 142° to 154°/0.3 to 0.5 mm). The residue, amounting to 58 parts, had a neutral equivalent of 168.7 in methanol. It was identified as phenylene-bis(3-butane-1,2-dicarboxylic anhydride), which has calculated neutral equivalent of 165. The yield was about 70.3% of theory based on the amount of monoanhydride consumed.

The synthesis can be represented by the following equation:

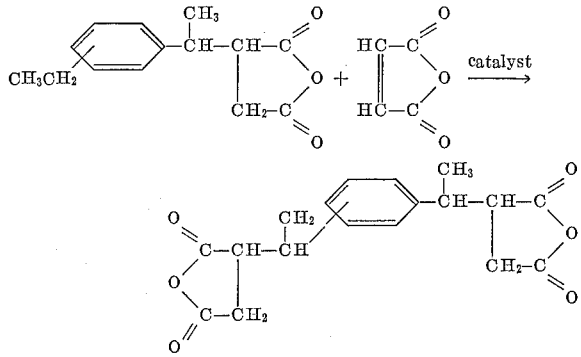

The following examples illustrate the surprising advantages of the novel curing agent in epoxy resin systems. Parts are by weight and temperatures are indicated in degrees centigrade.

EXAMPLE 1

A solution of 22.5 parts of phenylene-bis-(3-butane-1,2-dicarboxylic acid anhydride) in 25 parts of a standard commercially available epoxy resin (Epon 828—a product of Shell Development Corporation—being an epichlorohydrin-bisphenol-A liquid resin, having an average molecular weight of between 350 and 400 and an epoxy value [1] of 0.52) was prepared at 70° to 80°. To the solution, 0.36 part of benzyldimethylamine (0.02 mol/epoxy equivalent) was added and the mixture stirred until uniform. The solution was poured into a 7" x ½" x ½" brass mold, coated with a silicone mold release agent (Dow Corning DC–20). One end of the mold was closed

---

[1] Epoxy value ("oxirane value") represents the number of epoxy groups contained in 100 grams of epoxy resin. The epoxy value divided into 100 gives the epoxy equivalent. Thus, a resin having an epoxy value of 0.50 has an epoxy equivalent of 200.

with a Silastic 51 rubber plug. The resinous compositions were precured at 80° for two hours and postcured at 200° for 20 hours. The heat distortion temperature ("HDT") of the cured resin so obtained as determined by standard ASTM method D648–56 (10 mils deflection) was 184°.

EXAMPLE 2

By essentially the procedure of Example 1, an epoxy resin having an HDT of 192° was prepared using 21.4 parts of phenylene-bis-(3-butane-1,2 dicarboxylic acid anhydride)
20.0 parts of Epon 828
0.28 parts of benzyldimethylamine

EXAMPLE 3

In an analogous manner, other commercially available epoxy resins can be advantageously cured with the dianhydride agent of this invention. Thus using in the procedure of Example 1 above:

22.6 parts of phenylene-bis-(3-butane-1,2-dicarboxylic acid anhydride)
20.0 parts of Bakelite ERL 3794 (epoxy value=0.55)
0.297 part of benzyldimethylamine and curing as in Example 1 above, resulted in a resin having an "HDT" of 195°.

EXAMPLE 4

When epoxylated Novolac X–2638.3, an experimental product of Dow Chemical having an epoxy value of 0.556, was used instead of the Bakelite ERL 3794, and 22.9 parts instead of 22.6 parts of dianhydride were used, other variables being the same as in Example 3 above, the HDT of the cured resin was above 212°, the temperature maximum of the test apparatus.

EXAMPLE 5

Pyromellitic dianhydride has been proposed as an epoxy curing agent. This agent, however, is incompatible with many epoxy resins such as Epon 828 (epoxy value 0.52) and, being a relatively high melting solid, is difficult to incorporate and use. These defects can be overcome to some extent by admixture with other polycarboxylic acid anhydrides, such as phthalic acid anhydride, in order to increase compatibility and lower the melting point thus increasing the ease of incorporation. Phenylene-bis-(3-butane-1,2-dicarboxylic acid anhydride) can also be used in admixture with pyromellitic dianhydride as a curing agent for epoxy resins to produce resins characterized by high HDT.

16.1 parts of phenylene-bis-(3-butane-1,2-dicarboxylic acid anhydride) and 3.5 parts of pyromellitic dianhydride were melted together to form a homogeneous mixture which softens at 55° and becomes fluid at 90°. This mixture was added to 20 parts of Epon 828 and warmed until a tan opaque solution resulted. To this fluid mass, 0.28 part of benzyldimethylamine was added and the resin cured by the procedure of Example 1 above. The cured resin had a HDT value greater than 212°, the maximum temperature measurable in the available test apparatus.

EXAMPLE 6

The effect of postcure temperature and of variation of the anhydride equivalent per epoxy equivalent (A/E) on the heat-distortion temperature of epoxy resin systems was determined with resins cured with phenylene-bis-(3-butane-1,2 dicarboxylic acid anhydride) as set out in the columns headed "PBDAA" of Table I below. For comparison, similar resin systems cured with phthalic acid anhydride were prepared and heat-distortion temperatures were determined as set out in the columns headed "PAA" of Table I below.

TABLE I

Formulation and Curing Schedule:
Epoxy Resin—Epon 828 (epoxy value=0.52)
Catalyst—Benzyldimethylamine
Catalyst Concentration—0.02 mol/epoxy equivalent
Precure Schedule—2–3 hours at 80°
Postcure Schedule—20 hours at the indicated temperature

| Postcure Temperature | HDT | | | | | | |
|---|---|---|---|---|---|---|---|
| | A/E=0.85 | | A/E=1.05 | | A/E=1.25 | | A/E=1.45 |
| | PBDAA | PAA | PBDAA | PAA | PBDAA | PAA | PBDAA |
| 170° | 131° | 135° | 158.5° | 140° | 181.5° | 127° | 173°. |
| 200° | 139° | 129° | 184.0° | 152° | 192.0° | 118° | 167°. |
| 230° | 148° | 136° | 170.0° | 147° | 178.0° | | |

These data indicate that at an A/E of at least 1.05 and at a postcure temperature of at least about 170°, epoxy resin systems cured with phenylene-bis-(3-butane-1,2-dicarboxylic acid anhydride) are markedly superior with respect to HDT to those systems cured with phthalic acid anhydride.

EXAMPLE 7

The effect on HDT of phenylene-bis-(3-butane-1,2-dicarboxylic acid anhydride) as a curing agent for various commercially available epoxy resins is indicated by the data in Table II at A/E of 1.05 and 1.25.

TABLE II

Formulation and Curing Schedule:
Epoxy Resin—As indicated
Catalyst—Benzyldimethylamine
Catalyst concentration—0.02 mol/epoxy equivalent
Precure Schedule—2 hours at 80°
Postcure Schedule—20 hours at 200°

| | HDT | |
|---|---|---|
| | A/E=1.05 | A/E=1.25 |
| Araldite 6020 [1] | 172° | 170° |
| Epi Rez 510 [2] | 182° | 180° |
| Epi Rez 515 [3] | 168° | 163° |
| Bakelite ERL 3794 [4] | 178° | 195° |
| DER 332 [5] | 181° | 183° |
| Epon 834 [6] | 172° | 181° |
| Novolac X-2638.3 [7] | >210° | >210° |
| Epoxide 201 [8] | >210° | >210° |

Legend:  Visc. at 73° F (cp.)
[1] Product of Ciba, Inc., epoxy value 0.476 __ 20,000–40,000
[2] Product of Jones-Dabney, epoxy value 0.537 __ 10,000–20,000
[3] Product of Jones-Dabney, epoxy value 0.416 __ 40,000–90,000
[4] Product of Union Carbide, epoxy value 0.55 __
[5] Product of Dow Chemical, epoxy value 0.57 __ 3,600–6,400
[6] Product of Shell Chemical, epoxy value 0.38 __ 40,000–90,000
[7] Product of Dow Chemical, epoxy value 0.556, and being an epoxidized urea-formaldehyde resin __
[8] Product of Union Carbide, epoxy value 0.715, and having the probable chemical formula:

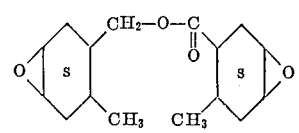

EXAMPLE 8

When the epoxy resin Epon 828 was formulated and cured in the manner described in Example 7 in the presence of the dianhydride obtained by reacting diisopropylbenzene with maleic acid anhydride in the manner described in Example A, its heat distortion temperature for an $A/E$ value of 1.05 was 155° and at an $A/E$ value of 1.25 its heat distortion temperature was found to be 154°.

EXAMPLE 9

When Epoxide 201 was formulated and cured in the manner described in Example 7 in the presence of the dianhydride obtained by reacting diisopropylbenzene with maleic acid anhydride in the manner described in Example A, its heat distortion temperature for an $A/E$ value of 1.05 was found to be >210° and for an $A/E$ value of 1.25 it was found to be >210°.

Examples 8 and 9 indicate that the anhydride used therein was more effective when used with the Epoxide 201 than when used with Epon 828.

It can thus be seen that a convenient and economical means has been provided whereby epoxy resin systems characterized by extremely high distortion temperature characteristics are obtained. Although certain preferred embodiments of the invention have been disclosed for purposes of illustration, it will be evident to those skilled in this art that various changes and modifications can be made therein without departing from the scope and spirit of the invention.

The polymerizable epoxy resin compositions which are cured by practicing the principles of this invention are well known in the art. As illustrated in Example 7, the dianhydride can be used to advantage with all types of epoxy resins: those in which the epoxy group is in a terminal position and those in which the epoxy group is in an internal position, as for example the Epoxide 201 referred to in Example 7 or any one of the many epoxy-containing materials referred to in U.S. Patent 2,949,441 under the headings of epoxidized esters of the polyethylenically unsaturated monocarboxylic acids, epoxidized esters of unsaturated monohydric alcohols and polycarboxylic acids, epoxidized esters of unsaturated alcohols and unsaturated carboxylic acids, epoxidized derivatives of polyethylenically unsaturated polycarboxylic acids, epoxidized polyesters obtained by reacting an unsaturated polyhydric alcohol and/or unsaturated polycarboxylic acid or anhydride and epoxidized polymers and polymers of diolefins such as butadiene. The specific position of the epoxy group is not a controlling feature. Such compositions, per se constitute no part of the invention. Further, it is common practice in this art to include various auxiliary materials such as reinforcing materials, inert powders and fillers, pigments, auxiliary catalyst extenders and the like in the resin composition.

While certain theoretical explanations have been resorted to in the specification for the purpose of clarification, it should be distinctly understood that applicants are not bound by the ultimate correctness of these theories.

We claim:
1. Dianhydride having the structural formula:

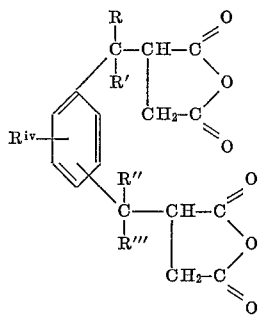

in which

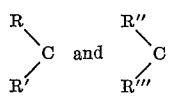

are alkylidene radicals each containing 2 to 6 carbon atoms and $R^{iv}$ represents 4 nuclear substituents each selected from the group consisting of hydrogen and $C_1$–$C_6$ alkyl radicals.

2. Phenylene-bis-(3-butane-1,2-dicarboxylic anhydride) having the structural formula:

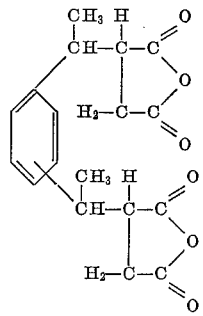

3. Phenylene - bis - (3 - methyl - 3 butane - 1,2 - dicarboxylic acid anhydride) having the structural formula:

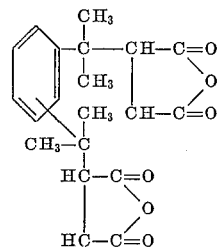

4. The proces for the preparation of dianhydrides of aryl polyaliphatic tetracarboxylic acids suitable for use as curing agents for epoxy resins which comprises reacting (1) a monoanhydride having the structural formula:

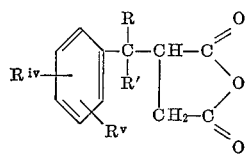

wherein

is an alkylidene radical containing 2 to 6 carbon atoms with (2) maleic acid anhydride in the presence of (3) a free radical catalyst while maintaining the mass at a temperature between about 135° C. and about 300° C.; and wherein the major portion of the maleic anhydride and the major portion of the catalyst are added incrementally during the reaction period.

References Cited by the Examiner

UNITED STATES PATENTS

| | | | |
|---|---|---|---|
| 2,135,709 | 11/1938 | Graves | 260—546 |
| 2,319,070 | 5/1943 | Lowe | 260—546 |
| 2,692,270 | 10/1954 | Beavers | 260—346.8 |
| 2,768,153 | 10/1956 | Shokal | 260—47 |
| 2,938,014 | 5/1960 | Bavley | 260—47 |
| 2,965,610 | 12/1960 | Newey | 260—47 |

ALEX MAZEL, *Primary Examiner.*

H. N. BERNSTEIN, NICHOLAS S. RIZZO, *Examiners.*

ARTHUR L. LIEBERMAN, HENRY R. JILES,
*Assistant Examiners.*